(12) United States Patent
Casini et al.

(10) Patent No.: US 11,247,405 B2
(45) Date of Patent: Feb. 15, 2022

(54) INDUCTOR FOR INDUCTION WELDING OF A PACKAGING MATERIAL

(71) Applicant: Tetra Laval Holdings & Finance S.A., Pully (CH)

(72) Inventors: Giulio Casini, San Casciano V.P. (IT); Luciano Amidei, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 266 days.

(21) Appl. No.: 16/489,933

(22) PCT Filed: Mar. 1, 2018

(86) PCT No.: PCT/EP2018/055074
§ 371 (c)(1),
(2) Date: Aug. 29, 2019

(87) PCT Pub. No.: WO2018/158383
PCT Pub. Date: Sep. 7, 2018

(65) Prior Publication Data
US 2019/0389145 A1  Dec. 26, 2019

(30) Foreign Application Priority Data
Mar. 3, 2017  (EP) .................................... 17159041

(51) Int. Cl.
*B29C 65/36* (2006.01)
*B29C 65/00* (2006.01)
*B29K 705/02* (2006.01)

(52) U.S. Cl.
CPC ...... *B29C 65/3656* (2013.01); *B29C 65/3668* (2013.01); *B29C 65/368* (2013.01);
(Continued)

(58) Field of Classification Search
CPC ............ B29C 65/3656; B29C 65/3668; B29C 65/368; B29C 66/72321; B29C 66/72328;
(Continued)

(56) References Cited

U.S. PATENT DOCUMENTS 3,676,271 A * 7/1972 Hake ....................... B29C 66/49
156/567
5,247,779 A * 9/1993 Wirsig ................ B29C 66/7373
53/373.7
(Continued)

FOREIGN PATENT DOCUMENTS

CN  105705317 A  6/2016
CN  106232328 A  12/2016
(Continued)

OTHER PUBLICATIONS

DE2653753A1 Machine Translation of the Description (EPO and Google) (Year: 2021).*
(Continued)

*Primary Examiner* — Cynthia L Schaller
(74) *Attorney, Agent, or Firm* — Knobbe, Martens, Olson & Bear LLP

(57) ABSTRACT

An inductor for induction welding of a packaging material having at least one layer of metal foil is disclosed. The inductor comprises a welding surface configured to be arranged opposite the packaging material for heating thereof, and at least one spacing element arranged to protrude from the welding surface in a first direction towards the packaging material, when the packaging material is arranged opposite the welding surface, whereupon the least one spacing element separates the packaging material from the welding surface by an off-set distance. A sealing machine for sealing packaging material and a method of welding a packaging material is also disclosed.

19 Claims, 5 Drawing Sheets

(52) U.S. Cl.
CPC .. *B29C 66/72321* (2013.01); *B29C 66/72328* (2013.01); *B29C 66/73921* (2013.01); *B29K 2705/02* (2013.01)

(58) Field of Classification Search
CPC ............ B29C 66/73921; B29C 66/849; B29C 66/8167; B29C 66/71; B29C 66/81457; B29C 65/7894; B29C 66/4322; B29C 66/0042; B29K 2705/02; B65B 51/227; B65B 51/26; B65B 9/2021; B65B 9/2028; B65B 9/207
See application file for complete search history.

(56) References Cited

U.S. PATENT DOCUMENTS

| | | | |
|---|---|---|---|
| 5,767,491 A | | 6/1998 | Ohlsson et al. |
| 10,562,236 B2 | | 2/2020 | Balties et al. |
| 2010/0180545 A1* | | 7/2010 | Palmquist .......... B29C 66/81457 53/285 |
| 2011/0167763 A1* | | 7/2011 | Waldherr .......... B29C 66/92451 53/371.8 |
| 2015/0266603 A1* | | 9/2015 | Aul .................... B29C 66/7373 53/374.2 |

FOREIGN PATENT DOCUMENTS

| | | |
|---|---|---|
| DE | 2653753 A1 * | 6/1978 |
| FR | 2748415 A1 | 11/1997 |
| GB | 1161901 A | 8/1969 |
| GB | 1161902 A | 8/1969 |
| NL | 6609787 A | 1/1967 |
| WO | WO 2015/078907 A1 | 6/2015 |

OTHER PUBLICATIONS

DE2653753A1 Machine Translation of the Claims (EPO and Google) (Year: 2021).*
Extended European Search Report for European Patent Application No. 17159041.7, dated Aug. 24, 2017, in 8 pages.
International Search Report and Written Opinion of the International Searching Authority for International Application No. PCT/EP2018/055074, dated May 15, 2018, in 11 pages.
Office Action issued in Chinese Patent Application No. CN 201810148711.1, dated Feb. 26, 2021, in 8 pages.
Search Report issued in Chinese Patent Application No. CN 201810148711.1, dated Feb. 18, 2021, in 1 page.
European Search Report issued in European U.S. Appl. No. 18/159,498, dated Jun. 27, 2018, in 2 pages.

* cited by examiner

INDUCTOR FOR INDUCTION WELDING OF A PACKAGING MATERIAL

CROSS-REFERENCE TO RELATED APPLICATIONS

This application is the U.S. National Phase under 35 U.S.C. § 371 of International Application PCT/EP2018/055074, filed Mar. 1, 2018, which claims priority to EP Application No. 17159041.7, filed Mar. 3, 2017, the entire contents of each of which are incorporated by reference herein and made a part of this specification.

TECHNICAL FIELD

The present invention generally relates to the field of induction heating. More particularly, the present invention relates to an inductor for welding of packaging material for sealing containers thereof, a sealing machine and a related method.

BACKGROUND

The welding of laminated packing material by means of induction heat is used in the packaging industry. One example of such a laminated material is a carrier layer of paper, aluminium foil and thermoplastic coatings along the inner and outer surfaces of the laminate. The technique of induction welding is based on the fact that the magnetic field around a conductor, generated by an alternating current is capable of inducing a current in an adjoining electrically conducting material, which depending on the resistance of the material, warms up the material. Thus, in induction welding an inductor loop or coil provided against the laminate containing the aluminium foil, and the laminate is pressed together with the material to which it is to be joined. The aluminium foil is heated by means of appropriately chosen current and processing period. The material is heated to a temperature which is high enough to seal adjoining layers of thermoplastic, causing the combined thermoplastic layers to fuse together, thus producing a tight and durable seal.

A problem often encountered in such sealing process is the contamination of the inductor. This is due to the accumulation of packaging material compounds, e.g. polyethylene residues, on the active welding surface of the inductor. The inductor is typically pressed against the packaging material to prevent fluctuations in the electrical parameters of the induction circuit that is formed between the inductor and the metal foil in the packaging material. Fluctuations in e.g. the impedance of the inductive circuit could otherwise impact the control of the sealing process, leading to suboptimal packaging seals or process interruptions due to exceeded impedance thresholds. Accumulation of chemical residues also necessitates frequent cleaning of the inductors, which in turn adds to the wear of the inductors, and reduced lifetime.

Hence, an improved inductor would be advantageous and in particular allowing for avoiding more of the above mentioned problems and compromises, including avoiding accumulation of chemical residues and providing for increased lifetime of the inductor. A related sealing machine for sealing a packaging material and a method of welding a packaging material would also be advantageous.

SUMMARY

Accordingly, examples of the present invention preferably seeks to mitigate, alleviate or eliminate one or more deficiencies, disadvantages or issues in the art, such as the above-identified, singly or in any combination by providing a device according to the appended patent claims.

According to a first aspect an inductor for induction welding of a packaging material having at least one layer of metal foil is provided. The inductor comprises a welding surface configured to be arranged opposite the packaging material for heating thereof, and at least one spacing element arranged to protrude from the welding surface in a first direction towards the packaging material, when the packaging material is arranged opposite the welding surface, whereupon the least one spacing element separates the packaging material from the welding surface by an off-set distance.

According to a second aspect a sealing machine for sealing packaging material is provided, comprising an inductor according to the first aspect, wherein the packaging material is conveyed to be arranged opposite a welding surface of the inductor and at least one spacing element arranged to protrude from the welding surface in a first direction towards the packaging material, whereupon the least one spacing element separates the packaging material from the welding surface by an off-set distance while being conveyed in sealing machine.

According to a third aspect a method of welding a packaging material having at least one layer of metal foil with an inductor is provided. The inductor has a welding surface configured to be arranged opposite the packaging material for heating thereof. The method comprises conveying the packaging material over the welding surface at an off-set distance from the welding surface by moving the packaging material over at least one spacing element arranged to protrude from the welding surface.

Further examples of the invention are defined in the dependent claims, wherein features for the second and third aspects of the disclosure are as for the first aspect mutatis mutandis.

Some examples of the disclosure provide for an inductor for induction welding of a packaging material that is less susceptible to contamination by packaging material residues.

Some examples of the disclosure provide for an inductor for induction welding of a packaging material that has an increased lifetime.

Some examples of the disclosure provide for an inductor for induction welding of a packaging material that requires less maintenance.

Some examples of the disclosure provide for an inductor that allows for increased stability in the electrical parameters of the inductive heating circuit.

Some examples of the disclosure provide for an inductor heating circuit that allows for improved control of the sealing process.

Some examples of the disclosure provide for more reliable sealing of packaging material containers.

Some examples of the disclosure provide for an increased throughput in an inductive sealing production line.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Figure 1:
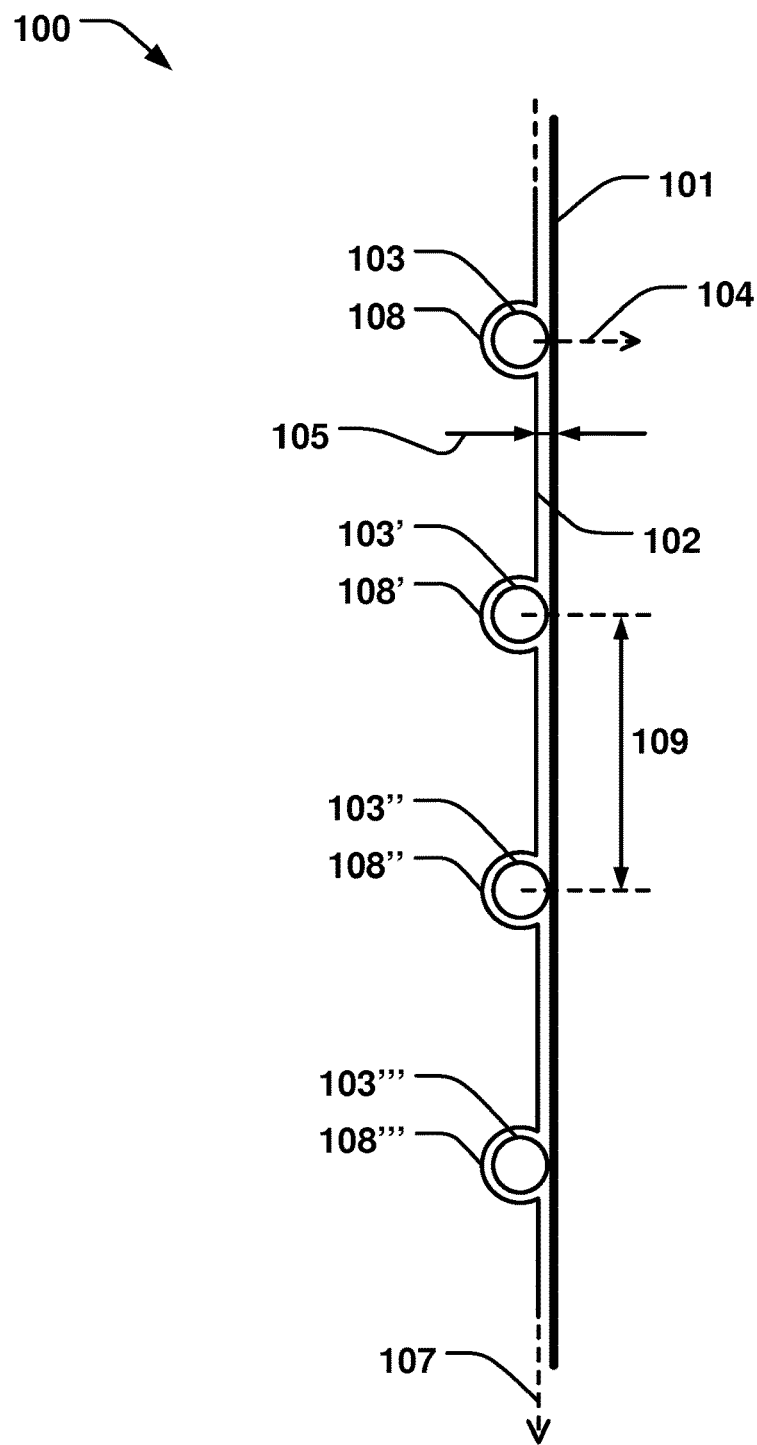
FIG. 1 schematically illustrates an inductor for welding of a packaging material according to one example.

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

FIG. 1 schematically illustrates an inductor 100 for induction welding of a packaging material 101 having at least one layer of metal foil. The inductor 100 comprises a welding surface 102 configured to be arranged opposite the packaging material 101 for heating thereof. At least one spacing element 103, 103', 103", 103''', is arranged to protrude from the welding surface 102 in a first direction 104 towards the packaging material 101, when the packaging material 101 is arranged opposite the welding surface 102. The at least one spacing element 103, 103', 103", 103''' (denoted 103-103''' for short below), thereby separates the packaging material 101 from the welding surface 102 by an off-set distance 105. By having at least one spacing element 103-103''' protruding from the welding surface 102 the packaging material 101 is prevented from contacting the welding surface 102, and is instead kept at the off-set distance 105 from the welding surface 105. Build-up of residues from the packaging material 101 on the welding surface 102, e.g. from polyethylene that is formed due to the high temperature exposed to the packaging material 101, can thus be prevented. This advantageously provides increasing the service interval, since less cleaning of the inductor 100 is required. At the same time, the at least one spacing element 103-103''' protruding from the welding surface 102 provides for achieving stable characteristics of the electrical parameters of the induction circuit since the packaging material 101 can be readily arranged against the at least one spacing element 103-103''' and thereby be kept at the well-defined off-set distance 105 from the welding surface 102. Having such defined separation minimizes the risk of fluctuations in e.g. the impedance of the induction heating circuit, which provides for optimized control of the welding process. The sealing procedure of the packaging containers may thus be made more reliable and completed in a shorter amount of time, since it is possible to more accurately control the power delivery to the inductor, thanks to the improved stability of the electrical characteristics involved the process. The lifetime of the inductor 100 can also be increased, due to the optimized power control and due to less wear on the inductor, which is a result of less exposure to contaminants and partly also because of fewer cleaning operations which contribute to the overall wear of the inductor 100. Thus, having at least one spacing element 103-103''' protruding from the welding surface 102 provides for a more robust inductor with increased lifetime, as well as improved control of the induction sealing process. The protrusion from the welding surface 102 by the least one spacing element 103-103''' should be construed as an extension from a plane in which the welding surface 102 of the inductor lies. I.e. turning to e.g. FIG. 1, the spacing element 103 extends or protrudes beyond such plane (which extends in the feed direction 107) in the first direction 104. In the example of FIG. 1 it is clear that the spacing element 103 may not need to be in abutment with the welding surface 102, but should regardless be construed as protruding or extending form the welding surface 102 in the first direction 104 towards the packaging material 101 as discussed.

Figure 2:
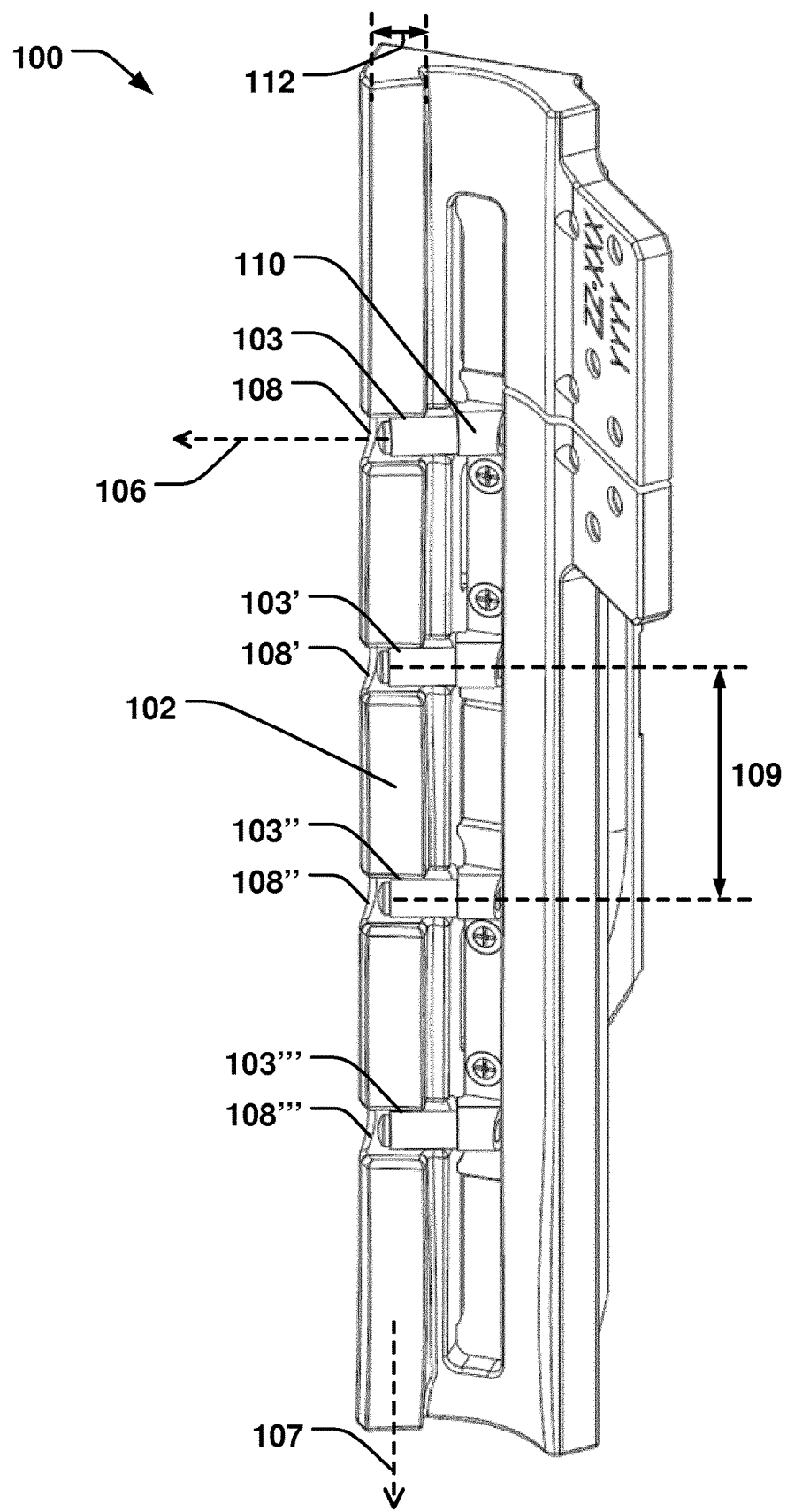
FIG. 2 schematically illustrates an inductor for welding of a packaging material according to one example.

As schematically illustrated in e.g. FIG. 1, the at least one spacing element 103-103''' may comprise at least one roller 103-103''' being pivotally fixed to the inductor 100 and being rotatable around a rotational axis 106, which is further illustrated in the top-down view of the inductor 100 in FIG. 2. The at least one roller 103-103''' is configured to convey the packaging material 101 across the welding surface 102 at the off-set distance 105. Having at least one roller 103-103''' provides for attaining the off-set distance 105 with the advantages as elucidated above while allowing for an efficient conveying of the packaging material 101 across the welding surface 102 with a minimum of frictional force exerted between the packaging material 101 and the welding surface 102. The at least one roller 103-103''' may thus freely rotate relative the welding surface 102. It is also conceivable however that the at least one spacing element 103-103''' may comprise a static, i.e. not rotating, low friction material that provides for an efficient sliding movement between the packaging material 101 and the at least one spacing element 103-103'''. A static spacing element 103-103''' may provide for an inductor 100 requiring a minimum of maintenance, albeit at least one roller 103-103''' may provide for advantages in terms of providing a minimum of frictional force against the packaging material 101. A static spacing element 103-103''' may comprise a material having a low friction coefficient while being highly resistant to contaminations and abrasion. It is further conceivable that at least one static spacing element 103-103''' may be combined with at least one movable spacing element 103-103''' in certain applications of the inductor 100 to provide for a balance between maintenance, manufacturing costs and movability. It is further conceivable that other movable spacing elements 103-103''' may be provided, such as spherical elements which may rotate relative to the welding surface 102.

The at least one roller 103-103''' may be extend across at least half of the width 112 of the welding surface 102, in the direction of the rotational axis 106. This may provide for further ensuring that the packaging material 101 is maintained at the off-set distance 105 from the welding surface 102 and that the packaging material 101 can be effectively and reliably conveyed over the welding surface 102.

As illustrated in e.g. FIGS. 1 and 2, the welding surface 102 may have an elongated extension in a feed direction 107 in which the packaging material 101 is conveyed, when arranged opposite the welding surface 102. The rotational axis 106 may extend parallel with the welding surface 102, i.e. in the plane of the welding surface 102, and perpendicular to the feed direction 107. Having the rotational axis 106 extending in the plane of the welding surface 102 may provide for further enduring that the packaging material 101 is kept at a constant off-set distance 105 across the welding surface 102. By having the rotational axis 106 extending perpendicular to the feed direction 107 the packaging material 101 may be exposed to a minimum of frictional force from the at least one roller 103-103'''.

Figure 3:
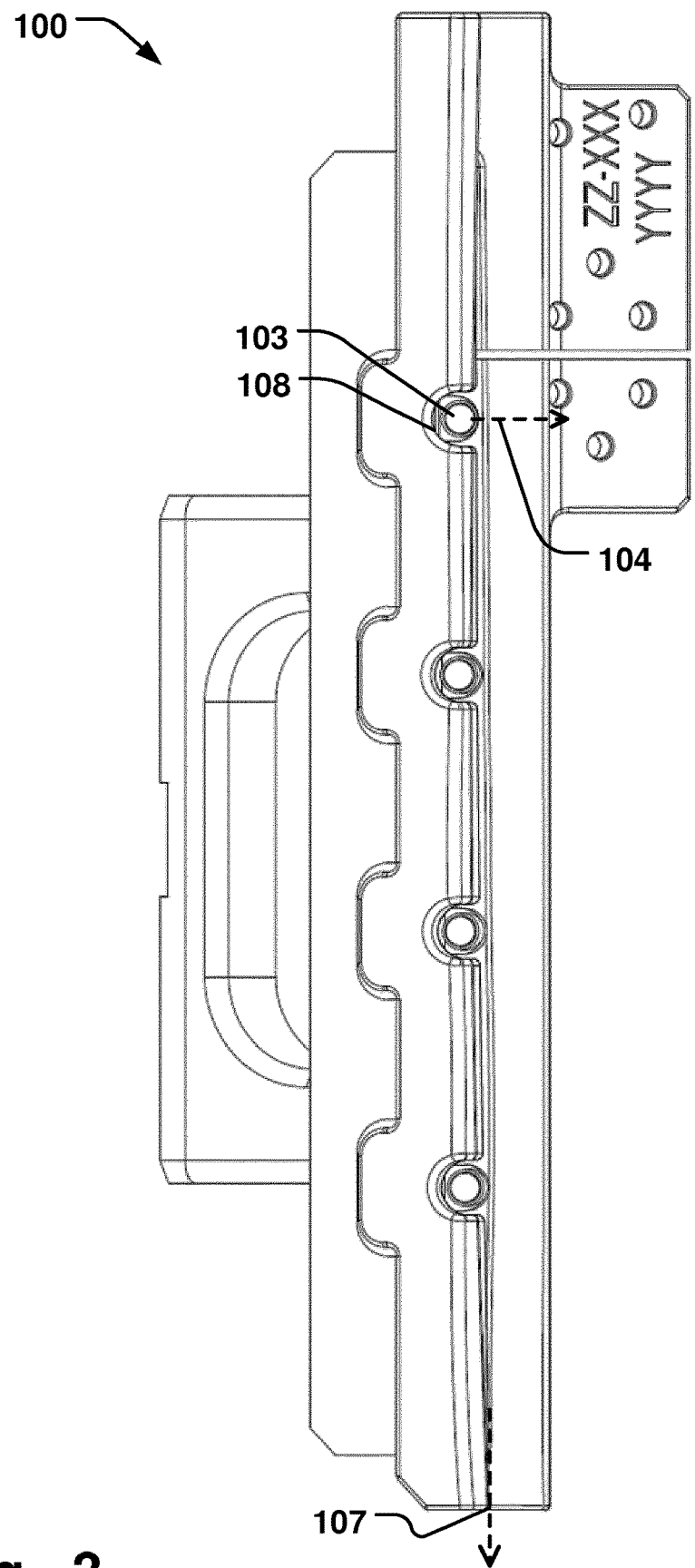
FIG. 3 schematically illustrates an inductor for welding of a packaging material, in a side-view, according to one example.
Figure 4:
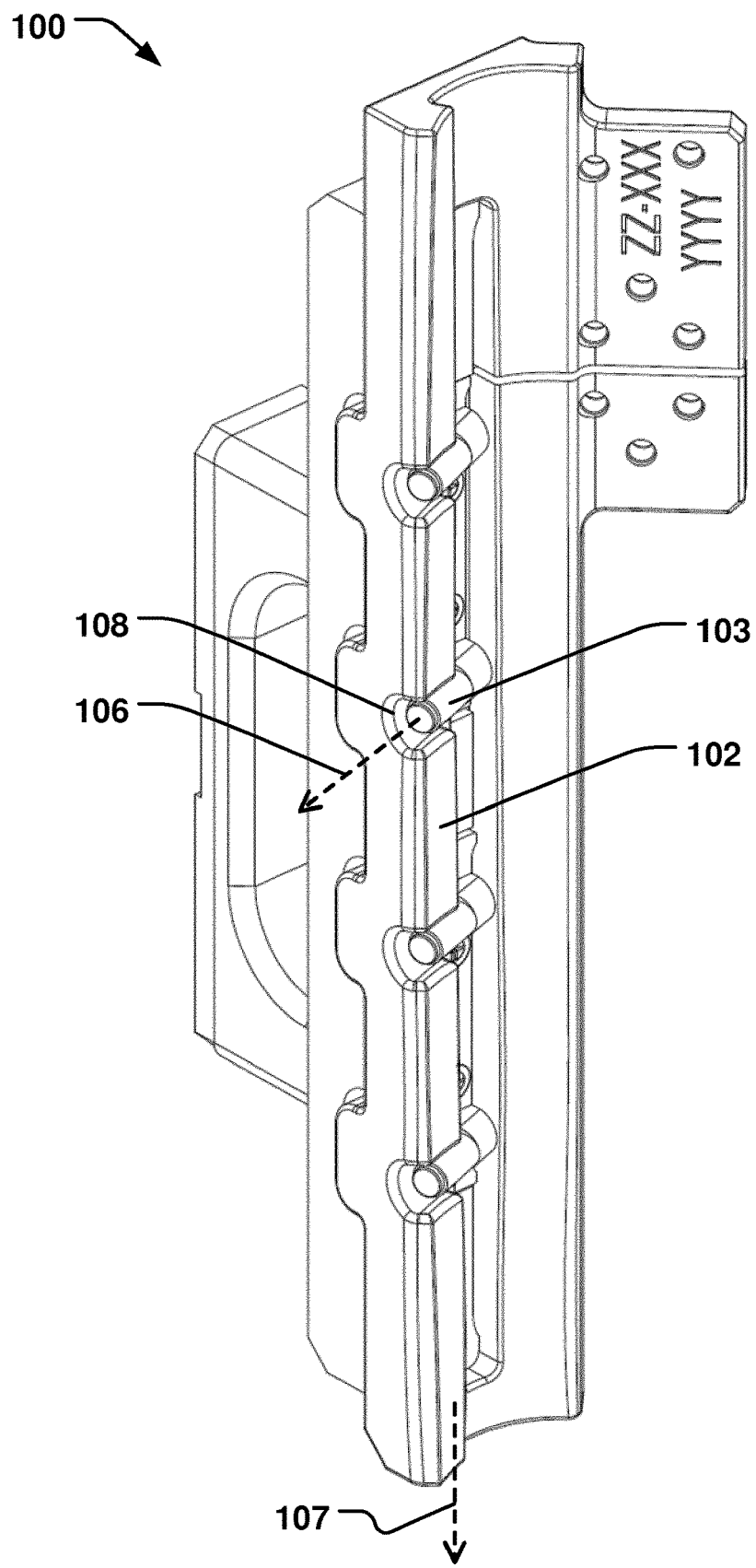
FIG. 4 schematically illustrates an inductor for welding of a packaging material, in a side-view, according to one example.

The at least one roller 103-103''' may be arranged in a corresponding recess 108, 108', 108'', 108''', in the welding surface 102, as illustrated in e.g. the side-views of FIGS. 1 and 3 or the perspective view of FIG. 4. Arranging the at least one roller 103-103''' in a recess allows for selecting an optimized diameter of the roller 103-103''' in order to provide for the desired dynamics of the relative movement between the roller 103-103''' and the packaging material 101, while being able to set the off-set distance 105 to the desired value.

The inductor 100 may comprise at least one support 110 in which the at least one roller 103-103''' is pivotally fixed, as schematically illustrated in FIG. 2. The at least one support 110 may be movably fixated to the inductor 100 and thereby be movable relative to the welding surface 102 such that the corresponding roller 103-103''', pivotally fixed to the support 110, has a variable position in the first direction 104, perpendicular to the welding surface 102 and the rotational axis 106. The off-set distance 105 may thus be readily varied and set to a range of values by moving the support 110 and the corresponding roller 103-103''' in the first direction 104, towards the packaging material 101. In case of having a plurality of rollers 103-103''', each of the rollers 103-103''' may be individually moved relative to each other to optimize the trajectory of the packaging material 101 across the welding surface 102. It is also conceivable that in case of having static spacing elements 103-103''', as discussed above, the position of the static spacing elements 103-103''' in the first direction 104 may be individually adjusted.

The at least one roller 103-103''' may comprise a cylindrical surface covered by a resilient material (not shown). Such resilient material may accommodate slight movements of the packaging material 101 in the first direction 104 and thereby smoothen out possible vibrations occurring in the packaging material 101 when conveyed over the welding surface 102. This may provide for increased stability in the trajectory of the packaging material 101 relative to the inductor 100 and further process stability with regards to the electrical characteristics of the inductive heating circuit established via the magnetic coupling of the inductor 100 to the metal foil of the packaging material 101.

The Inductor 100 may comprise a plurality of spacing elements 103, 103', 103'', 103''', as illustrated in FIGS. 1-4. The number of spacing elements 103-103''' may be selected depending on the particular application which may dictate varying requirements with respect to e.g. the dimensions of the inductor 100. FIGS. 1-4 illustrate examples with four spacing elements 103-103''', i.e. four rollers 103-103''' in these examples, which should however not be seen as limiting but instead mere examples of a number of spacing elements 103-103'''. Thus, it is conceivable that the number of spacing elements may be more or less than shown in the provided examples, depending on e.g. the length of the inductor 100 in the feed direction 107. The plurality of spacing elements 103-103''' may be separated from each other by a set separation distance 109 defined such that the packaging material 101 remains separated from the welding surface 102 along the separation distance 109 when conveyed in the feed direction 107. Thus the separation distance 109 is chosen such that the packaging material 101 does not abut the welding surface 102 between the spacing elements 103-103''' given a particular application. E.g. the speed by which the packaging material 101 is conveyed in the feed direction 107 over the welding surface 102 may be different in various applications, as well as the properties of the packaging material itself, which may affect the amount of flexing of the packaging material 101 between two spacing elements 103-103'''. The separation distance 109 may thus be varied to accommodate such factors and prevent flexing of the packaging material 101 to such extend it touches the welding surface 102. It is also conceivable that the spacing elements 103-103''' may be movable in the feed direction 107, i.e. being configured to be fixated at different separation distances 109, to provide for substantially maintaining the off-set distance 105 across the welding surface 102 while having separation distances 109 that minimize friction on the packaging material 101.

The plurality of spacing elements 103-103''' may comprise a plurality of rollers 103, 103', 103'', 103''', each arranged in a corresponding recess 108, 108', 108'', 108''' in the welding surface 102, as schematically illustrated in the examples of FIGS. 1-4. Such configuration may provide for a particularly advantageous inductor 100 with improved lifetime and stable electrical characteristics of the inductive heating circuit.

The at least one spacing element 103-103''' may be arranged such that the off-set distance 105 is substantially constant over the welding surface 102 along a feed direction 107 in which the packaging material 101 is conveyed, when arranged opposite the welding surface 102. A constant off-set distance 105 may further provide for achieving optimal stability and control of the electrical parameters of the inductive heating circuit.

The at least one spacing element 103-103''' may be thermally insulated from the welding surface 102. Thermally insulated should be construed as decreased thermal coupling between the at least one spacing element 103-103''' and the welding surface 102 so that the amount of thermal power transferred therebetween is reduced. The at least one spacing element 103-103''' may be thermally insulated from the welding surface 102 by having a thermally insulating material arranged inbetween the at least one spacing element 103-103''' and the welding surface 102, i.e. a material having a lower heat transfer coefficient than the welding surface 102. Alternatively, the at least one spacing element 103-103''' may be separated from the welding surface 102 as in the case of having at least one roller 103-103''', shown in the examples of FIGS. 1-4. The air gap between the at least one roller 103-103''' and the welding surface 102 may be varied to achieve the desired amount of thermal insulation, so that the packaging material 101 is not heated excessively when in contact with the at least one roller 103-103'''. Formation of compound residues such as polyethylene on the at least one roller 103-103''' may thereby be prevented.

The at least one spacing element 103-103''' may be removably fixated to the inductor 100. It is thus possible to allow for efficient and facilitated maintenance and optimization of the at least one spacing element 103-103''' on the inductor 100. It is also conceivable that the number of spacing element 103-103''', e.g. rollers 103-103''', may be varied as desired, by removing or attaching rollers 103-103''' to the inductor 100 depending on the particular application. A high degree of customizability of the inductor 100 is thus provided and replacement of the inductor 100 as a whole can be avoided.

A sealing machine for sealing a packaging material 101 is provided. The sealing machine comprises an inductor 100 as described above in relation to FIGS. 1-4. In the sealing machine, the packaging material 101 is conveyed to be arranged opposite a welding surface 102 of the inductor 100, and at least one spacing element 103, 103', 103", 103"', is arranged to protrude from the welding surface 102 in a first direction 104 towards the packaging material 101, whereupon the least one spacing element 103-103"' separates the packaging material 101 from the welding surface 102 by an off-set distance 105 while being conveyed in sealing machine. This thus provides for a sealing machine with the advantages as described above in relation to the inductor 100 and FIGS. 1-4.

Figure 5:
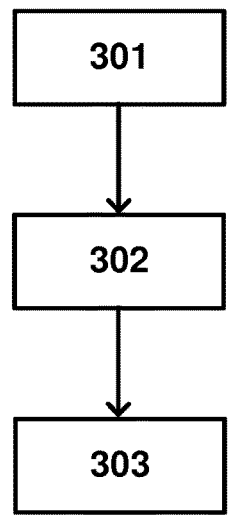
FIG. 5 is a flowchart of a method of welding a packaging material.

FIG. 5 illustrates a flow chart of a method 300 of welding a packaging material 101 having at least one layer of metal foil with an inductor 100. The order in which the steps of the method 300 are described and illustrated should not be construed as limiting and it is conceivable that the steps can be performed in varying order. The inductor 100 has a welding surface 102 configured to be arranged opposite the packaging material 101 for heating thereof. The method 300 comprises conveying 301 the packaging material 101 over the welding surface 102 at an off-set distance 105 from the welding surface 102 by moving 302 the packaging material 101 over at least one spacing element 103, 103', 103", 103"' arranged to protrude from the welding surface 102. A method 300 of welding a packaging material 101 with an inductor 100 is thus provided with the associated advantages as described above in relation to the inductor 100 and FIGS. 1-4.

The at least one spacing element 103-103"' may comprise a plurality of rollers 103, 103', 103", 103"'. The method 300 may comprise rolling 303 the packaging material 101 on the rollers 103-103"' over the welding surface 102 to maintain the off-set distance 105 between the packaging material 101 and the welding surface 102 along a feed direction 107 in which the welding surface 102 extends and in which direction the packaging material 101 is conveyed.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

What is claimed is:

1. An induction apparatus for induction welding of a packaging material having at least one layer of metal foil, the induction apparatus comprising
    an inductor configured to heat the packaging material via induction,
    a welding surface configured to have the packaging material arranged along the welding surface for heating the packaging material, the inductor comprising the welding surface, and
    at least one spacing element protruding from the welding surface in a first direction towards the packaging material for the at least one spacing element to space the packaging material from the welding surface, with the packaging material arranged along the welding surface, whereupon the least one spacing element separates and aligns the packaging material from the welding surface by an off-set distance.

2. The induction apparatus according to claim 1, wherein the at least one spacing element comprises at least one roller being pivotally fixed to the induction apparatus and being rotatable around a rotational axis, whereby the at least one roller is configured to convey the packaging material across the welding surface at the off-set distance.

3. The induction apparatus according to claim 2, wherein the welding surface has an elongated extension in a feed direction in which the packaging material is conveyed, with the packaging material arranged along the welding surface, and where the rotational axis extends parallel with the welding surface and perpendicular to the feed direction.

4. The induction apparatus according to claim 2, wherein the at least one roller is arranged in a corresponding recess in the welding surface.

5. The induction apparatus according to claim 2, comprising at least one support in which the at least one roller is pivotally fixed, wherein the at least one support is movable relative to the welding surface such that the roller pivotally fixed thereto has a variable position in the first direction, perpendicular to the welding surface and the rotational axis.

6. The induction apparatus according to claim 2, wherein the at least one roller comprises a cylindrical surface covered by a resilient material.

7. The induction apparatus according to claim 1, comprising the at least one spacing element comprises a plurality of spacing elements, the plurality of spacing elements separated from each other by a set separation distance defined such that the packaging material remains separated from the welding surface along the separation distance when conveyed in a feed direction.

8. The induction apparatus according to claim 7, wherein the plurality of spacing elements comprises a plurality of rollers each arranged in a corresponding recess in the welding surface.

9. The induction apparatus according to claim 1, wherein the at least one spacing element is arranged such that the off-set distance is substantially constant over the welding surface along a feed direction in which the packaging material is conveyed, with the packaging material arranged along the welding surface.

10. The induction apparatus according to claim 1, wherein the at least one spacing element is thermally insulated from the welding surface.

11. The induction apparatus according to claim 1, wherein the at least one spacing element is removably fixated to the induction apparatus.

12. A sealing machine for sealing the packaging material, comprising the induction apparatus according to claim 1, with the packaging material arranged along the welding surface, the least one spacing element separating the packaging material from the welding surface by the off-set distance while being conveyed in the sealing machine.

13. The induction apparatus according to claim 1, wherein the at least one spacing element is separate from the welding surface.

14. A method of welding a packaging material having at least one layer of metal foil with an inductor configured to heat the packaging material via induction, the inductor having a welding surface configured to have the packaging material arranged along the welding surface for heating the packaging material, the method comprising conveying the packaging material over the welding surface at an off-set distance from the welding surface by moving the packaging material over at least one spacing element protruding from the welding surface, wherein the at least one spacing element is arranged such that the off-set distance is substantially constant over the welding surface along a feed direction in which the packaging material is conveyed.

15. The method according to claim 14, wherein the at least one spacing element comprises a plurality of rollers, the method comprising rolling the packaging material on the rollers over the welding surface to maintain the off-set distance between the packaging material and the welding surface along a feed direction in which the welding surface extends and in which direction the packaging material is conveyed.

16. The method according to claim 15, wherein the plurality of rollers are each pivotally fixed via a corresponding support, wherein each corresponding support is movable relative to the welding surface such that the rollers pivotally fixed thereto have a variable position perpendicular to the welding surface.

17. The method according to claim 15, wherein the plurality of rollers each comprise a cylindrical surface covered by a resilient material.

18. The method according to claim 14, wherein the at least one spacing element comprises a plurality of spacing elements, the plurality of spacing elements separated from each other by a set separation distance defined such that the packaging material remains separated from the welding surface along the separation distance when conveyed in a feed direction.

19. The method according to claim 18, wherein the plurality of spacing elements comprises a plurality of rollers each arranged in a corresponding recess in the welding surface.

* * * * *